United States Patent Office 3,172,894
Patented Mar. 9, 1965

3,172,894
3-CARBAMOYLMETHOXY-5-ANDROSTENE-17-ONES
Fred Kagan and Norman A. Nelson, Kalamazoo, Mich., assignors to The Upjohn Company, Kalamazoo, Mich., a corporation of Delaware
No Drawing. Filed May 1, 1963, Ser. No. 277,098
9 Claims. (Cl. 260—397.4)

This invention relates to novel 3-amidoether steroids and is more particularly concerned with 3β-(carbamolymethoxy) - 5 - androsten-17-one, 3β-(diethylcarbamoylmethoxy) - 5 - androsten-17-one and 3β-[(2-hydroxyethyl)methylcarbamoylmethoxy]-5-androsten-17-one and with the methods of production thereof.

The novel compounds of this invention and the methods of their production can be illustratively represented by the following sequence of formulae:

The novel compounds of the present invention possessing the amidoether structure

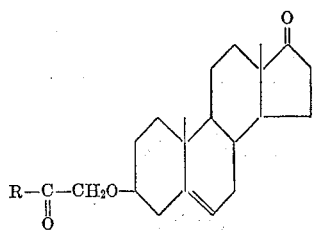

wherein R is selected from the group consisting of

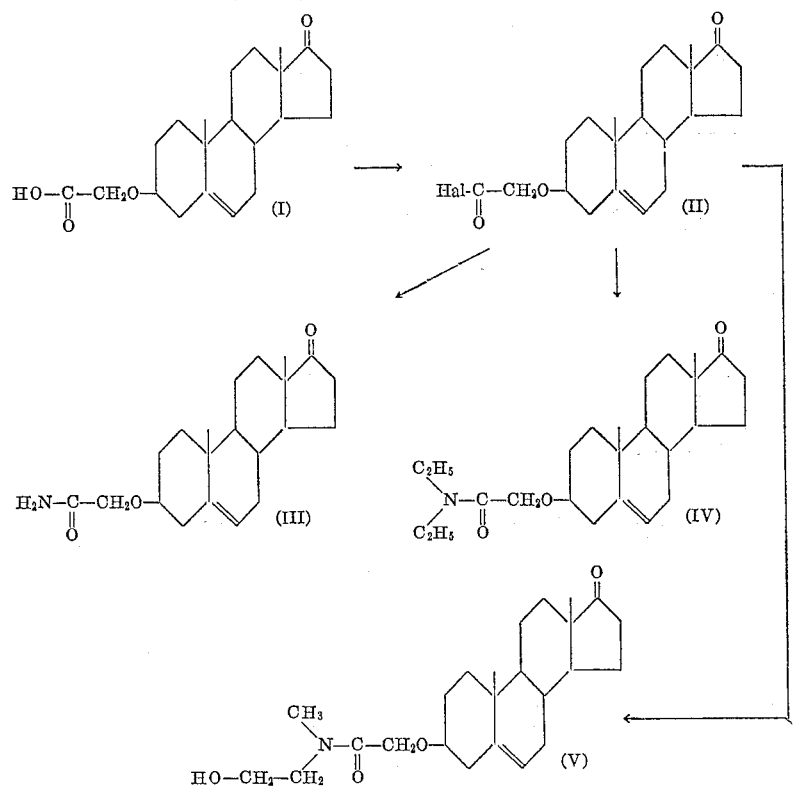

wherein Hal is chlorine, bromine or iodine.

The process of production of the novel compounds of structures (III), (IV) and (V) comprises: treating 3β-(carboxymethoxy)-5-androsten-17-one (I) with a halogenating agent, e.g., oxalyl chloride, oxalyl iodide, sulfuryl chloride, thionyl chloride, oxalyl bromide and the like to obtain the corresponding acid halide, 3β-(haloformylmethoxy)-5-androsten-17-one (II); treating (II) with ammonia yields 3-(carbamoylmethoxy)-5-androsten-17-one (III); treating compound (II) with diethylamine yields 3β - (diethylcarbamoylmethoxy)-5-androsten-17-one (IV) and treating compound (II) with methyl aminoethanol yields 3β - [(2 - hydroxyethyl)methylcarbamoyl]-5-androsten-17-one (V).

and

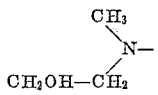

have sedative and diuretic properties and can be used in symptomatic treatment of mammals, or birds to produce sedation or diuresis.

The novel products are also useful as intermediates for the production of compounds possessing hypocholesteremic properties. For this purpose the 17-keto group is protected by formation of an acetal, or the like, produced by standard procedures, e.g., the ketal is produced by heating a 3-amidoether steroid selected from compounds of Formulae III, IV and V, dissolved in benzene with ethylene glycol in the presence of p-toluenesulfonic acid. The thus-produced 3-amidoether steroid with a protected 17-carbonyl group is reduced with lithium aluminum hydride or by a Bouveault-Blanc reduction to yield the corresponding 3-aminoether steroid. The resulting 3β-(2-aminoethoxy)-5-androstene-17-ones with or without substituents on the amino group are highly active as hypocholesteremic agents and are thus useful in the treatment of atherosclerosis as described in detail in copending application S.N. 81,269, filed January 9, 1961.

The starting material of this invention, 3β-(carboxymethoxy)-5-androsten-17-one (I) is described in the literature by A. Ercoli et al., Gazz Chim. ital 68, 142 (1938) [Chem. Abstracts 32, 6661 (1938)].

In carrying out the process of this invention 3β-(carboxymethoxy)-5-androsten-17-one (I) is converted by standard methods to the acid halide, 3β-(haloformylmethoxy)-5-androsten-17-one (II). In the preferred embodiment of the invention the carboxy group is converted to the chloroformyl group by inorganic agents such as thionyl chloride, sulfuryl chloride, phosphorus oxychloride and the like or by organic agents such as oxalyl chloride, phthalyl chloride and the like. Instead of converting the carboxyl group to the chloroformyl group, the group can be converted to bromo- or iodoformyl by using oxalyl bromide or iodide phosphorus tribromide and similar reagents. Iodoformyl compounds may be prepared by the use of phosphorus triiodide or phosphorus and iodine.

In the preferred embodiment the reaction is carried out with oxalyl chloride in an organic solvent such as tetrahydrofuran at a temperature between −10 and 40° C. The reaction time, depending on the temperature, is between 5 and 120 minutes.

After the reaction is terminated the 3β-(haloformylmethoxy)-5-androsten-17-one is isolated by evaporating the solution at a low temperature, preferably not exceeding 25° in vacuo. The thus obtained product, 3β-(haloformylmethoxy)-5-androsten-17-one (II) is used without further purification in the crude form obtained.

The 3β-(haloformylmethoxy)-5-androsten-17-one (II) is converted to the desired 3β-(carbamoylmethoxy)-5-androsten-17-one by reacting the acid halide (II) with ammonia, diethylamine, or methylaminoethanol in an organic solvent which is inert to the acid halide, for example diethylether, dibutylether, tetrahydrofuran and the like. The reaction is conveniently carried out at a temperature between −10 and 50° C. The reaction time is between 15 minutes and 3 to 4 hours, usually not exceeding 2 hours. To isolate the product, standard methods of isolation are used, usually removal of the solvent by distillation of the solvent and recrystallization or chromatography of the thus-obtained residues from organic solvents such as acetone, methyl alcohol, Skellysolve B, ether and the like. Details of the reaction are given in the following examples.

EXAMPLE 1

*3β-(chloroformylmethoxy)-5-androsten-17-one*

A solution was prepared containing 2 g. of 3β-(carboxymethoxy)-5-androsten-17-one in 25 ml. of tetrahydrofuran containing 2 drops of pyridine and 5 ml. of redistilled oxalyl chloride having a boiling point of 60–61° C. This mixture was stirred for 30 minutes at 0° C. and thereupon for 30 minutes at room temperature. The solution was then concentrated in vacuo at a temperature below 25° using a rotating evaporator. 25 ml. of anhydrous benzene was added during the concentration and the resulting solution was again concentrated in vacuo at room temperature until a solid residue was obtained.

In the same manner as shown above 2 g. of 3β-(carboxymethoxy)-5-androsten-17-one were converted with 5 ml. of oxalyl bromide [obtained as described by Staudinger and Anthes, Ber., 46 1431 (1913)], in tetrahydrofuran, at 0° and under exclusion of light, to 3β-(bromoformylmethoxy)-5-androsten-17-one.

In the same manner oxalyl iodide [prepared by the method of Spindler, Ann., 231, 272 (1885), i.e., reacting oxalyl chloride and calcium iodide] is used to prepare the corresponding 3β-(iodoformylmethoxy)-5-androsten-17-one.

EXAMPLE 2

*3β-(carbamoylmethoxy)-5-androsten-17-one*

A solution was prepared containing 3β-(chloroformylmethoxy)-5-androsten-17-one as obtained from 5 g. of 3β-(carboxymethoxy)-5-androsten-17-one by the process of Example 1, dissolved in 100 ml. of dry tetrahydrofuran and added to 150 ml. of tetrahydrofuran, saturated with ammonia, at a temperature of 0°. After all the 3β-(chloroformylmethoxy)-5-androsten-17-one solution was added, the mixture was stirred at room temperature for a period of 2 hours and thereupon concentrated in vacuo. The resulting residue was dissolved in methylene chloride and water and the organic layer was washed repeatedly with water, separated and dried over anhydrous sodium sulfate. The organic solution was thereupon heated to remove the solvent and the resulting residue was recrystallized from tetrahydrofuran-Skellysolve B hexanes to give 1.27 g. of 3β-(carbamoylmethoxy)-5-androsten-17-one of a melting point of 194 to 197° C., rotation $[\alpha]_D$ 0° in chloroform solution and possessing an analysis as follows:

*Analysis.*—Calcd. for $C_{21}H_{31}NO_3$: C, 73.00; H, 9.05; N, 4.05. Found: C, 72.77; H, 9.39; N, 3.80.

Likewise, 3β-(carbamoylmethoxy)-5-androsten-17-one is obtained by reacting 3β-(bromoformylmethoxy)-5-androsten-17-one with ammonia in tetrahydrofuran solution.

EXAMPLE 3

*3β-(diethylcarbamoylmethoxy)-5-androsten-17-one*

A solution was prepared containing in 50 ml. of tetrahydrofuran the amount of 3β-(chloroformylmethoxy)-5-androsten-17-one obtained when 2 g. of 3β-(carboxymethoxy)-5-androsten-17-one was converted by the method of Example 1. To this solution at 0° C. was added 5 ml. of diethylamine. The mixture was then stirred at room temperature for a period of 2 hours and concentrated in vacuo. The residue obtained from the concentration was dissolved in ethyl acetate, the ethyl acetate solution was washed with water, then in sequence dilute acid, dilute base, then again water and dried over anhydrous sulfate. The dried organic solution was concentrated and the thus-produced residue was recrystallized from a mixture of Skellysolve B hexanes-ether (3:2) to give 1.75 g. of 3β-(diethylcarbamoylmethoxy)-5-androsten-17-one. This material after additional recrystallization from ether gave 1.45 g. of 3β-(diethylcarbamoylmethoxy)-5-androsten-17-one of melting point of 110–110.5° C. and rotation $[\alpha]_D$ +5° in chloroform.

*Analysis.*—Calcd. for $C_{25}H_{39}NO_3$: C, 74.77; H, 9.79; N, 3.49. Found: C, 73.90; H, 9.39; N, 3.53.

In similar manner, as shown in Example 3, 3β-(bromoformyl- or iodoformylmethoxy)-5-androsten-17-one can be reacted with diethylamine in tetrahydrofuran solution to give 3β-(diethylcarbamoylmethoxy)-5-androsten-17-one.

EXAMPLE 4

*3β-[(2-hydroxyethyl)methylcarbamoylmethoxy]-5-androsten-17-one*

A solution was prepared containing 3β-(chloroformylmethoxy)-5-androsten-17-one as obtained by converting 5 g. of the free acid, 3β-(carboxymethoxy)-5-androsten-17-one, according to Example 1, in 100 ml. of dry tetrahydrofuran. To this solution there was added 10 ml. of methylaminoethanol and the resulting reacting mixture was stirred at room temperature (23° C.) for 2 hours. The mixture was thereupon diluted with ethyl acetate and the ethyl acetate solution was washed 3 times with water and thereupon dried over anhydrous sodium sulfate. The dried solution was heated in vacuo to remove the solvent and the thus-obtained solid residue was recrystallized from acetone-Skellysolve B hexanes (1:2) to give crude 3β - [(2 - hydroxyethyl)methylcarbamoylmethoxy] - 5-androsten-17-one. Recrystallization of this material from acetone-Skellysolve B hexanes gave pure 3β-[(2-hydroxyethyl)methylcarbamoylmethoxy] - 5 - androsten-17-one of melting point 147–149° C., rotation $[\alpha]_D$ +3° in chloroform and having an analysis as follows:

*Analysis.*—Calcd. for $C_{24}H_{37}NO_4$: C, 71.44; H, 9.24; N, 3.47; O, 15.85. Found: C, 71.64; H, 9.09; N, 3.39; O, 15.95.

In the same manner as given in Example 4, but substituting 3β-(chloroformylmethoxy)-5-androsten-17-one with 3β-(bromoformyl- or iodoformylmethoxy)-5-androsten-17-one and stirring at a temperature of 30° in tetrahydrofuran results in 3β-[2-hydroxyethyl)methylcarbamoylmethoxy]-5-androsten-17-one.

EXAMPLE 5

*3β-(diethylaminoethoxy)-5-androsten-17-one*

2 g. of 3β-(diethylcarbamoylmethoxy)-5-androsten-17-one was dissolved in 200 ml. of benzene to which was added 10 ml. of ethylene glycol and 0.25 g. of p-toluenesulfonic acid. The mixture was heated with stirring at the reflux temperature for a period of 5 hours while the water formed in the reaction was collected in a water trap by azeotropic distillation. The cooled reaction mixture was washed with 100 ml. of a 2% aqueous bicarbonate solution. The benzene layer was then poured on a column of 200 g. of Florisil synthetic magnesium silicate. The column was developed with 150 ml. portions of solvents consisting of methylene chloride and methylene chloride-acetone. The methylene chloride eluates were combined and evaporated to yield 3β-(diethylcarbamoylmethoxy)-5-androsten-17-one 17-cyclic ethylene acetal.

A solution of 1.5 g. of 3β-(diethylcarbamoylmethoxy)-5-androsten-17-one 17-cyclic ethylene acetal, dissolved in 75 ml. of benzene was added dropwise to a stirred mixture of 1.5 g. of lithium aluminum hydride in 100 ml. of anhydrous ether. When the addition was complete, the reaction mixture was refluxed for 15 hours, the reaction mixture was then cooled to room temperature and 50 ml. of 2-N-sodium hydroxide was cautiously added under stirring to decompose the excess lithium aluminum hydride. Thereafter, 200 ml. of methylene chloride was added and the organic phase was separated. The organic phase was washed several times with water and thereupon dried over anhydrous sodium sulfate. Evaporation of the solvent of the organic phase gave a residue which was redissolved in 25 ml. of methanol and 5 ml. of concentrated hydrochloric acid. After one hour, the mixture was poured into 150 ml. of 4% sodium hydroxide solution and the product was extracted with ether. The ether extract was dried over anhydrous sodium sulfate. The ether solution was then treated with hydrogen chloride. The precipitate was recrystallized from methylene chloride-ether to give 3β-(diethylaminoethoxy)-5-androsten-17-one hydrochloride of melting point 194–197° C. and rotation $[\alpha]_D$+17° in methanol.

We claim:
1. A 3-amidoether steroid of the formula

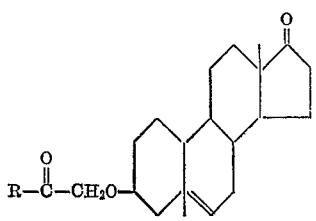

wherein R is selected from the group consisting of

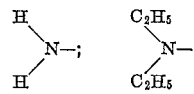

and

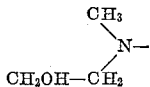

2. 3β-carbamoylmethoxy)-5-androsten-17-one.
3. 3β-(diethylcarbamoylmethoxy)-5-androsten-17-one.
4. 3β-[(2-hydroxyethyl) - methylcarbamoylmethoxy]-5-androsten-17-one.
5. A process for the production of a 3-amidoether steroid of the formula

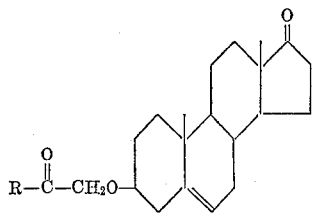

wherein R is selected from the group consisting of

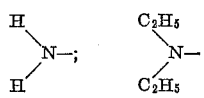

and

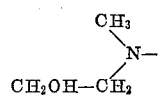

which comprises: treating 3β-(carboxymethoxy)-5-androsten-17-one with a halogenating agent selected from the group consisting of thionyl chloride; sulfuryl chloride, phosphorus oxychloride, bromide and iodide; oxalyl chloride, bromide and iodide; and phthalyl chloride to obtain the corresponding 3β-(haloformylmethoxy)-5-androsten-17-one and treating the thus-obtained haloformyl compound with a reagent selected from the group consisting of ammonia, diethylamine and methylaminoethanol.

6. The process of claim 5 wherein the halogenating reagent is oxalyl chloride.

7. A process according to claim 5 for the production of 3β-(carbamoylmethoxy)-5-androsten-17-one, wherein the halogenating agent is oxalyl chloride and the thus-obtained 3β-(chloroformylmethoxy)-5-androsten-17-one is treated with ammonia in tetrahydrofuran.

8. A process according to claim 5 for the production of 3β-(diethylcarbamoyl) - 5 - androsten-17-one, wherein the halogenating agent is oxalyl chloride and the thus-obtained 3β-(chloroformylmethoxy)-5-androsten-17-one is treated with diethylamine in tetrahydrofuran.

9. A process according to claim 5 for the production of 3β - [(2-hydroxyethyl)-methylcarbamoylmethoxy]-5-androsten-17-one, wherein the halogenating agent is oxalyl chloride and the thus-obtained 3β-(chloroformylmethoxy)-5-androsten-17-one is treated with methylaminoethanol in tetrahydrofuran.

No references cited.